(12) United States Patent
Lv et al.

(10) Patent No.: US 12,206,803 B2
(45) Date of Patent: Jan. 21, 2025

(54) DATA TRANSMISSION METHOD, APPARATUS, AND SYSTEM, COMPUTER DEVICE, AND STORAGE MEDIUM

(71) Applicant: Tencent Technology (Shenzhen) Company Limited, Guangdong (CN)

(72) Inventors: Jun Lv, Shenzhen (CN); Wenjun Liu, Shenzhen (CN); Runzeng Guo, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 276 days.

(21) Appl. No.: 17/943,699

(22) Filed: Sep. 13, 2022

(65) Prior Publication Data
US 2023/0006843 A1  Jan. 5, 2023

Related U.S. Application Data

(63) Continuation of application No. PCT/CN2021/123278, filed on Oct. 12, 2021.

(30) Foreign Application Priority Data

Nov. 20, 2020 (CN) .......................... 202011308606.3

(51) Int. Cl.
*H04L 29/06* (2006.01)
*G06F 21/73* (2013.01)
(Continued)

(52) U.S. Cl.
CPC ............ *H04L 9/3271* (2013.01); *G06F 21/73* (2013.01); *H04L 9/0643* (2013.01); *H04L 9/0869* (2013.01)

(58) Field of Classification Search
CPC ... H04L 9/3271; H04L 9/0643; H04L 9/0869; H04L 63/0442; H04L 63/0464;
(Continued)

(56) References Cited

U.S. PATENT DOCUMENTS

2007/0090920 A1\* 4/2007 Canter ..................... G07C 9/27
340/5.7
2010/0225733 A1\* 9/2010 Beers .................... H04L 65/401
348/14.08
(Continued)

FOREIGN PATENT DOCUMENTS

CN 108848107 A 11/2018
CN 111615096 A 9/2020
(Continued)

OTHER PUBLICATIONS

International Search Report for PCT/CN2021/123278 dated Dec. 22, 2021.
(Continued)

*Primary Examiner* — Malcolm Cribbs
(74) *Attorney, Agent, or Firm* — Sughrue Mion, PLLC

(57) ABSTRACT

A data transmission method, apparatus, and system, a computer device, and a storage medium. The method includes: performing two-way authentication with a first interaction device; receiving encrypted interaction data obtained by encrypting interaction data based on a working key and transmitted by the first interaction device, after the two-way authentication is completed, the working key being obtained by the first interaction device by mapping an authentication key used in the two-way authentication; decrypting the encrypted interaction data according to the working key obtained by mapping the authentication key on the communication adapter; transmitting interaction data obtained through the decryption to a second interaction device through a simulated device node identifiable by the second (Continued)

interaction device and based on a communication protocol of the second interaction device that is natively adapted to the device node.

20 Claims, 7 Drawing Sheets

(51) Int. Cl.
*H04L 9/06* (2006.01)
*H04L 9/08* (2006.01)
*H04L 9/32* (2006.01)

(58) Field of Classification Search
CPC . H04L 63/0869; H04L 63/205; H04L 9/3273; G06F 21/73; G06F 21/445
See application file for complete search history.

(56) References Cited

U.S. PATENT DOCUMENTS

| | | | |
|---|---|---|---|
| 2017/0163670 A1* | 6/2017 | Manadhata | H04L 61/4511 |
| 2019/0268764 A1 | 8/2019 | Wei | |
| 2019/0349342 A1* | 11/2019 | D'Ercoli | H04W 12/63 |

FOREIGN PATENT DOCUMENTS

| | | |
|---|---|---|
| JP | 2003-44436 A | 2/2003 |
| JP | 2007-81889 A | 3/2007 |
| WO | 2018/051817 A1 | 3/2018 |

OTHER PUBLICATIONS

Written Opinion for PCT/CN2021/123278 dated Dec. 22, 2021.
Japanese Office Action dated Apr. 23, 2024 in Application No. 2023-519198.
"Bluetooth Adapter BA20-RU User's Manual," Denso Wave Incorporated, 2015, pp. 1-24 (34 pages total).
Extended European Search Report issued Nov. 28, 2023 in App. No. 21893628.4.
Diallo Alhassane Saliou, "Enhancement Of Bluetooth Security Authentication Using Hash-based Message Authentication Code (HMAC) Algorithm", Jan. 2015, ResearchGate, Kulliyyah of Engineering International Islamic University Malaysia, DOI:10.13140/RG.2.1.1196.0082 (191 pages).
Indian Office Action dated Jun. 11, 2024 in Application No. 202347015541.

* cited by examiner

DATA TRANSMISSION METHOD, APPARATUS, AND SYSTEM, COMPUTER DEVICE, AND STORAGE MEDIUM

CROSS-REFERENCE TO RELATED APPLICATION(S)

This application is a continuation application of International Application No. PCT/CN2021/123278, filed on Oct. 12, 2021, which claims priority to Chinese Patent Application No. 202011308606.3, filed with the China National Intellectual Property Administration on Nov. 20, 2020, the disclosures of which are incorporated by reference in their entireties.

FIELD

The disclosure relates to the field of wireless communication technologies, and in particular, to a data transmission method, apparatus, and system, a computer device, and a storage medium.

BACKGROUND

In some specific application scenarios, there are two different devices for data transmission. These two different devices can transmit data wirelessly. In the process of transmitting data wirelessly, generally the communication link is encrypted to ensure the secure transmission of the data. However, in the process of data transmission, the use of communication link encryption may not be able to effectively ensure data security. If the data encryption and decryption processes are performed on two different devices respectively, it is necessary to perform software adaptation on the two different devices. For example, Bluetooth software adaptation is required when using Bluetooth to transmit data, resulting in poor software versatility, making it impossible to ensure the effect of interaction between devices while ensuring secure data transmission.

SUMMARY

Embodiments of this application provide a data transmission method, apparatus, and system, a computer device, and a storage medium.

In some embodiments, a data transmission method, executed by a communication adapter, may be provided, the method including: performing two-way authentication with a first interaction device; receiving encrypted interaction data obtained by encrypting interaction data based on a working key and transmitted by the first interaction device, after the two-way authentication is completed, the working key being obtained by the first interaction device by mapping an authentication key used in the two-way authentication; decrypting the encrypted interaction data according to the working key obtained by mapping the authentication key on the communication adapter; and transmitting interaction data obtained through the decryption to a second interaction device through a simulated device node identifiable by the second interaction device and based on a communication protocol of the second interaction device that is natively adapted to the device node.

In some embodiments, a data transmission apparatus may be provided, the apparatus including: an authentication module, configured to perform two-way authentication with a first interaction device; a receiving module, configured to receive encrypted interaction data obtained by encrypting interaction data based on a working key and transmitted by the first interaction device, after the two-way authentication is completed, the working key being obtained by the first interaction device by mapping an authentication key used in the two-way authentication; a decryption module, configured to decrypt the encrypted interaction data according to the working key obtained by mapping the authentication key on the communication adapter; and a transmission module, configured to transmit interaction data obtained through the decryption to a second interaction device through a simulated device node identifiable by the second interaction device and based on a communication protocol of the second interaction device that is natively adapted to the device node.

In some embodiments a data transmission system may be provided, the data transmission system including: a first interaction device, a second interaction device, and a communication adapter wirelessly connected to the first interaction device and electrically connected to the second interaction device, the communication adapter being configured to authenticate the first interaction device; the first interaction device being configured to authenticate the communication adapter in a case that the communication adapter has completed the authentication, and after completing the authentication of the communication adapter, encrypt interaction data based on a working key obtained by mapping an authentication key used in two-way authentication to obtain encrypted interaction data; the communication adapter being further configured to receive the encrypted interaction data obtained by encrypting the interaction data based on the working key and transmitted by the first interaction device; the communication adapter being further configured to decrypt the encrypted interaction data according to the working key obtained by mapping the authentication key on the communication adapter; the second interaction device being configured to identify a device node simulated by the communication adapter; and the communication adapter being further configured to transmit interaction data obtained through the decryption to the second interaction device through the simulated device node identifiable by the second interaction device and based on a communication protocol of the second interaction device that is natively adapted to the device node.

A computer device may be provided, including a memory and a processor, the memory storing computer-readable instructions, the processor, when executing the computer-readable instruction, implementing the following operations: performing two-way authentication with a first interaction device; receiving encrypted interaction data obtained by encrypting interaction data based on a working key and transmitted by the first interaction device, after the two-way authentication is completed, the working key being obtained by the first interaction device by mapping an authentication key used in the two-way authentication; decrypting the encrypted interaction data according to the working key obtained by mapping the authentication key on the communication adapter; and transmitting interaction data obtained through the decryption to a second interaction device through a simulated device node identifiable by the second interaction device and based on a communication protocol of the second interaction device that is natively adapted to the device node.

A non-volatile computer-readable storage medium may be provided, where the computer-readable storage medium stores computer-readable instructions, and the computer-readable instructions, when being executed by a processor, implement the following operations: performing two-way authentication with a first interaction device; receiving encrypted interaction data obtained by encrypting interaction data based on a working key and transmitted by the first interaction device, after the two-way authentication is completed, the working key being obtained by the first interaction device by mapping an authentication key used in the two-way authentication; decrypting the encrypted interaction data according to the working key obtained by mapping the authentication key on the communication adapter; and transmitting interaction data obtained through the decryption to a second interaction device through a simulated device node identifiable by the second interaction device and based on a communication protocol of the second interaction device that is natively adapted to the device node.

A computer-readable instruction product may be provided, including computer-readable instructions, the computer-readable instructions being stored in a computer-readable storage medium. A processor of a computer device reads the computer-readable instructions from the computer-readable storage medium, and the processor executes the computer-readable instructions, to cause the computer device to perform the operations of the data transmission method.

Details of one or more embodiments of the disclosure are provided in the accompanying drawings and descriptions below. Other features, objectives, and advantages become apparent from the specification, the drawings, and the claims.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

To make the objectives, technical solutions, and advantages of this application clearer, the following further describes this application in detail with reference to the accompanying drawings and the embodiments. It is to be understood that the specific embodiments described herein are only used for explaining this application, and are not used for limiting this application.

Figure 1:
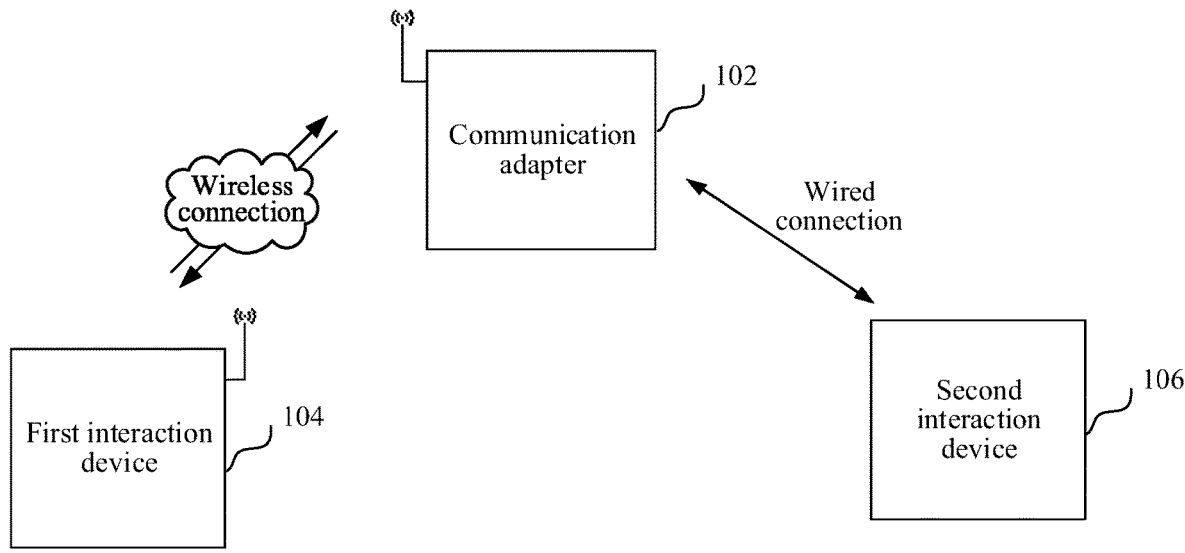
FIG. 1 is a diagram showing an application environment of a data transmission method according to some embodiments.

A data transmission method provided in some embodiments can be applied to an application environment shown in FIG. 1. In this application environment, a communication adapter 102, a first interaction device 104 and a second interaction device 106 are included. The communication adapter 102 is wirelessly connected to the first interaction device 104. The communication adapter 102 is electrically connected to the second interaction device 106, for example, by a wired connection. The communication adapter 102 performs two-way authentication with the first interaction device 104. After completing the two-way authentication, the communication adapter 102 receives encrypted interaction data obtained by encrypting interaction data based on a working key and transmitted by the first interaction device 104. The working key is obtained by mapping an authentication key by the first interaction device. The communication adapter 102 decrypts the encrypted interaction data according to the working key obtained by mapping the authentication key on the communication adapter; and transmits interaction data obtained through the decryption to a second interaction device 106 through a simulated device node identifiable by the second interaction device 106 and based on a communication protocol of the second interaction device 106 that is natively adapted to the device node.

The communication adapter 102 may serve as a bridge between the first interaction device 104 and the second interaction device 106 to implement data exchange between the first interaction device 104 and the second interaction device 106. Specifically, the communication adapter 102 may be a Bluetooth dongle, a ZigBee adapter, a near field communication adapter, other wireless adapters, and the like. The communication adapter 102 may be an independent component, or may be a component integrated in the second interaction device 106.

The first interaction device 104 may be a scanning device, such as a device for scanning a face, a device for scanning a graphic code, and the like. The graphic code may be a barcode or a two-dimensional code, or may be other types of graphic codes that carry information.

The second interaction device 106 may be a resource transfer device, and is configured to perform an interaction operation according to interaction data during interaction with the first interaction device 102, where the interaction operation includes a resource transfer operation. In addition, a control operation may also be performed based on control data transmitted by the first interaction device and the second interaction device.

Figure 2:
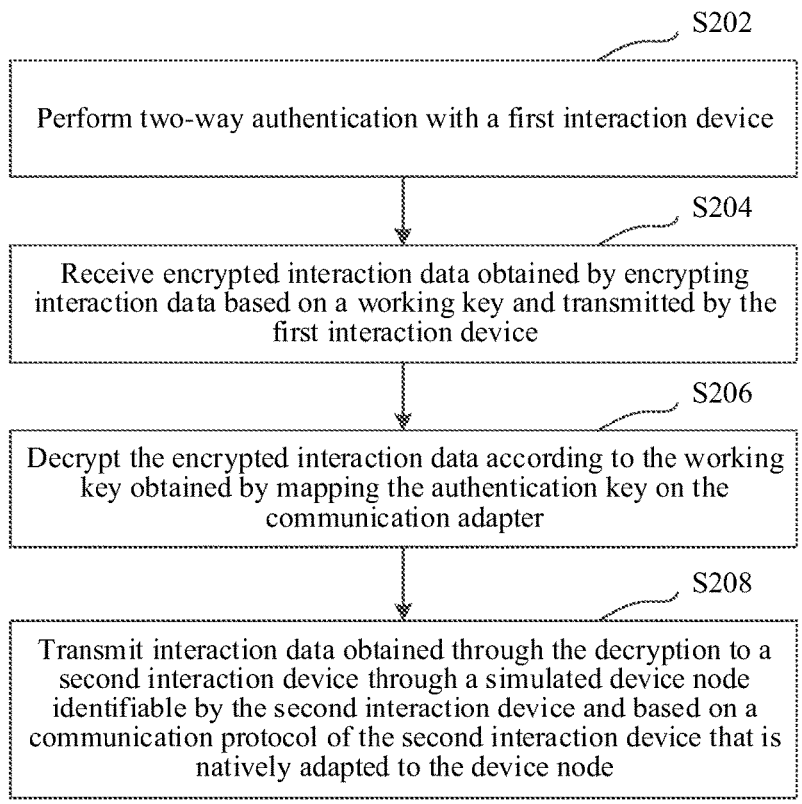
FIG. 2 is a schematic flowchart of a data transmission method according to some embodiments.

In an embodiment, as shown in FIG. 2, a data transmission method is provided. The method is, for example, applied to the communication adapter 102 in FIG. 1. The communication adapter 102 is wirelessly connected to the first interaction device 104, and electrically connected to the second interaction device 106. The method includes following operations:

S202. Perform two-way authentication with a first interaction device.

The two-way authentication means that the first interaction device authenticates the communication adapter, and then the communication adapter also authenticates the first interaction device, to ensure that both the communication adapter and the first interaction device are reliable devices.

In an embodiment, the communication adapter may use an authentication key to perform two-way authentication with the first interaction device, or may perform two-way authentication with the first interaction device based on an authentication key and a random number. Therefore, S202 may be performed by either of the following two authentication manners:

Manner 1: Perform two-way authentication with the first interaction device based on an authentication key and a random number.

In an embodiment, the communication adapter receives a first challenge code transmitted by the first interaction device; decrypts the first challenge code based on the authentication key to obtain a first random number, the first random number being a random number generated by the first interaction device; performs a hash operation on the first random number to obtain a first hash value; generates a second random number, and encrypts the first hash value and the second random number based on the authentication key to obtain a second challenge code; transmits the second challenge code to the first interaction device, so that the first interaction device decrypts the second challenge code based on the authentication key to obtain a first hash value, compares the first hash value with a second hash value obtained by the first interaction device by encrypting the first random number based on the authentication key, and in response to the first hash value being same as the second hash value, performs a hash operation on a second random number obtained by decrypting the second challenge code, and returns a second hash value obtained by the hash operation; and receives the second hash value returned by the first interaction device, compares the second hash value with a third hash value obtained by performing a hash operation on the second random number based on the authentication key locally on the communication adapter, and in response to the second hash value being same as the third hash value, determines that the two-way authentication between the communication adapter and the first interaction device is complete.

The authentication key in Manner 1 may be a key generated based on a device serial number of the communication adapter, and may be used in combination with a random number to perform two-way authentication with the first interaction device.

The first challenge code may be a challenge code obtained by the first interaction device by encrypting the first random number generated by the first interaction device with the authentication key. The first random number may be a true random number or a pseudo random number generated by the first interaction device.

The second random number may be a true random number or a pseudo random number generated by the communication adapter. The first random number and the second random number are two different random numbers. The second challenge code is a challenge code obtained by the communication adapter by encrypting a combination of the first hash value and the second random number with the authentication key, or by respectively encrypting the first hash value and the second random number with the authentication key and combining results of the encryption.

In the solution of this method, the first interaction device does not directly transmit the first random number, but transmits the first challenge code obtained by encrypting the first random number with the authentication key. The communication adapter does not directly transmit the second random number, but transmits the second challenge code obtained by encrypting the first hash value and the second random number with the authentication key. In this way, the accuracy in the authentication process can be improved while avoiding information leakage.

The authentication key used by the communication adapter to encrypt the second random number is generated by the communication adapter according to the device serial number of the communication adapter. The authentication key used by the first interaction device to encrypt the first random number is generated by the first interaction device according to the device serial number of the communication adapter. The authentication key generated by the first interaction device is the same as the authentication key generated by the communication adapter. To generate the authentication key, the communication adapter and the first interaction device encrypts the device serial number of the communication adapter according to a serial number encryption key to obtain the authentication key.

A method for obtaining the authentication key may include following operations: receiving, by the communication adapter, a serial number obtaining request transmitted by the first interaction device; obtaining a device serial number specified in the serial number obtaining request; returning the obtained device serial number to the first interaction device, so that the first interaction device generates an authentication key on the first interaction device based on the returned device serial number; and generating an authentication key on the communication adapter according to the obtained device serial number, the authentication key on the first interaction device being same as the authentication key on the communication adapter.

The authentication key on the first interaction device is obtained by encrypting the returned device serial number based on a serial number encryption key stored in the first interaction device.

In an embodiment, the operation of generating an authentication key on the communication adapter according to the obtained device serial number may further include: obtaining, by the communication adapter, the serial number encryption key stored in the communication adapter; and encrypting the obtained device serial number based on the serial number encryption key to obtain the authentication key on the communication adapter.

Figure 3:
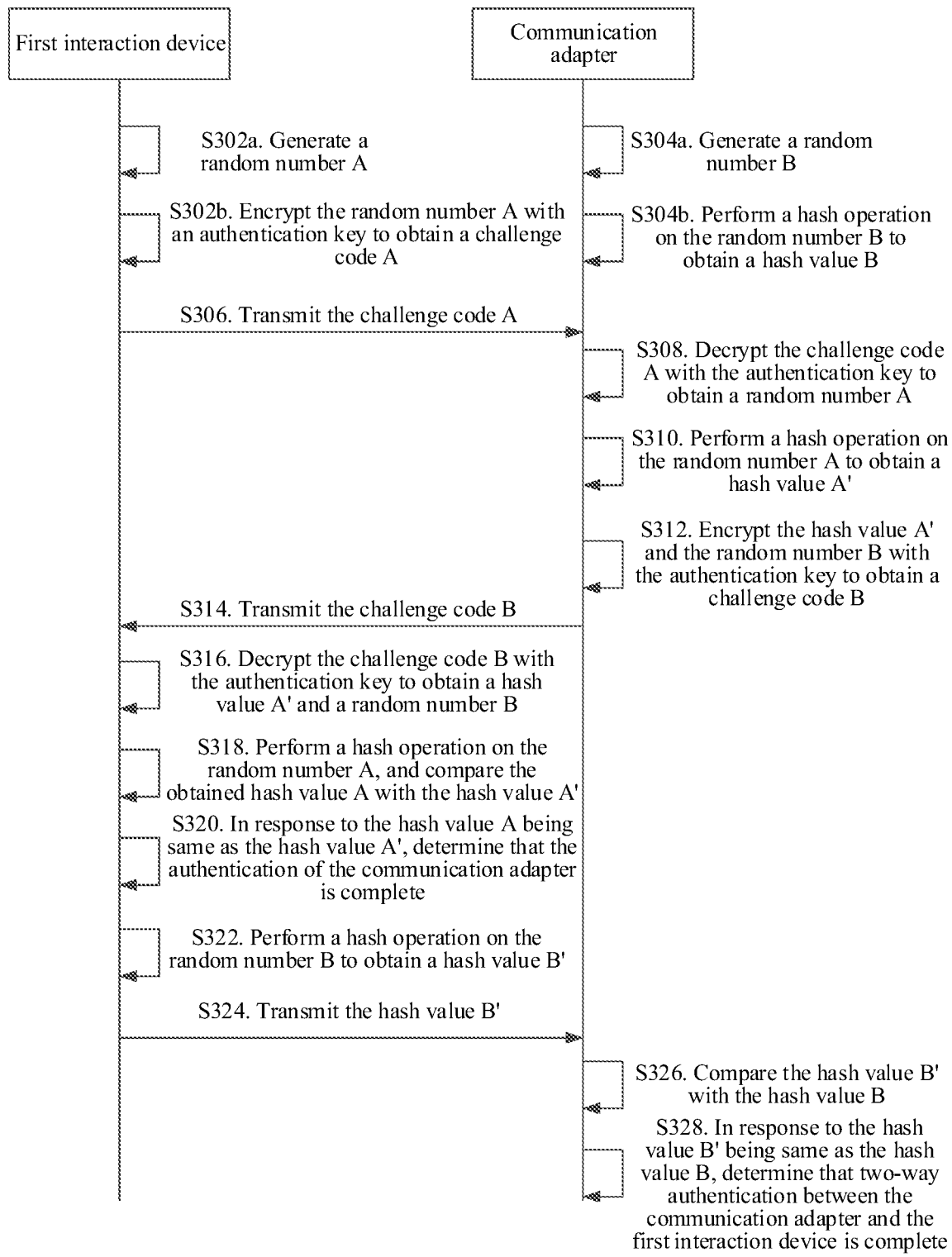
FIG. 3 is a schematic flowchart of operations of two-way authentication according to some embodiments.

For a better understanding of the two-way authentication process, the two-way authentication process is described with reference to FIG. 3. As shown in FIG. 3, the two-way authentication includes the following operations:

S302$a$. The first interaction device generates a random number A.

S302$b$. The first interaction device encrypts the random number A with an authentication key to obtain a challenge code A.

S304$a$. The communication adapter generates a random number B.

S304$b$. The communication adapter performs a hash operation on the random number B to obtain a hash value B.

S306. The first interaction device transmits a challenge code A.

S308. After receiving the challenge code A, the communication adapter decrypts the challenge code A with the authentication key to obtain a random number A.

The authentication key used in S308 may be generated by the communication adapter based on the device serial number of the communication adapter.

S310. The communication adapter performs a hash operation on the random number A to obtain a hash value A'.

S312. The communication adapter encrypts the hash value A' and the random number B with the authentication key to obtain a challenge code B.

S314. The communication adapter transmits a challenge code B.

S316. After receiving the challenge code B, the first interaction device decrypts the challenge code B with the authentication key to obtain a hash value A' and a random number B.

The authentication key used in S316 may be generated by the first interaction device based on the device serial number of the communication adapter.

S318. The first interaction device performs a hash operation on the random number A, and compares the obtained hash value A with the hash value A'.

S320. In response to the hash value A being same as the hash value A', the first interaction device determines that the authentication of the communication adapter is complete.

S322. The first interaction device performs a hash operation on the random number B to obtain a hash value B'.

S324. The first interaction device transmits the hash value B'.

S326. The communication adapter compares the hash value B' with the hash value B.

S328. In response to the hash value B' being same as the hash value B, determine that two-way authentication between the communication adapter and the first interaction device is complete.

Manner 2. Perform two-way authentication with the first interaction device based on an authentication key.

In an embodiment, the authentication key includes a first authentication key generated by the communication adapter based on its own device serial number, and a second authentication key generated by the first interaction device based on its own device serial number. The communication adapter transmits the first authentication key to the first interaction device, so that the first interaction device compares the received first authentication key with at least one authentication key stored in the first interaction device or with at least one authentication key stored in an authentication server. If an authentication key same as the first authentication key is found among the stored at least one authentication key, it indicates that the communication adapter passes the authentication, and the authentication of the communication adapter by the first interaction device is complete. In this case, the first interaction device transmits the second authentication key to the communication adapter. The communication adapter receives the second authentication key transmitted by the first interaction device, and then compares the second authentication key with at least one authentication key stored in the communication adapter or with at least one authentication key stored in an authentication server. If a match is found, it indicates that the first interaction device passes the authentication, and the authentication of the first interaction device by the communication adapter is complete. Thus, the two-way authentication is complete.

S204. Receive encrypted interaction data obtained by encrypting interaction data based on a working key and transmitted by the first interaction device.

The interaction data is used for interaction between the first interaction device and the second interaction device.

The interaction data may be face image data, payment code data or control data. For example, when the interaction data is face image data, the first interaction device transmits encrypted face image data to the second interaction device, so that the second interaction device recognizes the face image data, compares a result of the recognition with facial features in a facial feature database to find a matching facial feature, and then returns payment information associated with the matching facial feature to the first interaction device for display, for the user to confirm a payment.

The working key is obtained by mapping the authentication key by the first interaction device, and is used to encrypt and decrypt the data to be transmitted. For example, the first interaction device encrypts the authentication key to obtain the working key, or performs a hash operation on the authentication key to obtain the working key. The authentication key used by the first interaction device may be a key generated by the first interaction device according to the device serial number of the communication adapter, for example, a key obtained by encrypting the device serial number of the communication adapter with the serial number encryption key. In addition, the authentication key used by the first interaction device may also be a key generated according to the device serial number of the communication adapter and delivered by the authentication server.

In an embodiment, both the communication adapter and the first interaction device may store the authentication key, and the authentication key is generated based on the device serial number of the communication adapter; and S204 may further include: after the first interaction device obtains the working key by mapping the authentication key stored therein and encrypts the interaction data with the obtained working key to obtain the encrypted interaction data, receiving, by the communication adapter, the encrypted interaction data obtained by encrypting the interaction data and transmitted by the first interaction device. The authentication key stored in the first interaction device may be generated by the first interaction device according to the device serial number of the communication adapter, or the authentication key stored in the first interaction device may be generated according to the device serial number of the communication adapter and delivered by the authentication server. The method for generating the authentication key may be encrypting the device serial number of the communication adapter with the serial number encryption key to obtain the authentication key.

Specifically, the first interaction device obtains the working key by mapping the authentication key stored therein, encrypts the interaction data with the obtained working key to obtain the encrypted interaction data, and then transmits the encrypted interaction data to the communication adapter, so that the communication adapter may receive the encrypted interaction data obtained by encrypting the interaction data and transmitted by the first interaction device.

S206. Decrypt the encrypted interaction data according to the working key obtained by mapping the authentication key on the communication adapter.

In an embodiment, both the communication adapter and the first interaction device may store the authentication key; S206 may further include: obtaining, by the communication adapter, the working key by mapping the authentication key stored in the communication adapter, and decrypting the encrypted interaction data based on the obtained working key. The authentication key stored in the communication adapter may be generated according to the device serial number of the communication adapter, or the authentication key stored in the communication adapter may be generated according to the device serial number of the communication adapter and delivered by the authentication server.

S208. Transmit interaction data obtained through the decryption to a second interaction device through a simulated device node identifiable by the second interaction device and based on a communication protocol of the second interaction device that is natively adapted to the device node.

The device node is a virtual node for the communication adapter to communicate with the second interaction device. The device node is a virtual node simulated by the communication adapter after being inserted into a hardware interface of the second interaction device, and may include a human-machine interaction keyboard node and a human-machine interaction controller node. The human-machine interaction keyboard node may be a Universal Serial Bus-Human Interface Device (USB-HID) keyboard node. The human-machine interaction controller node may be a USB-HID controller node.

The communication protocol may be a USB-HID protocol, which is a protocol for the communication adapter to connect to and communicate with the second interaction device. Since the communication protocol is natively adapted by an operating system of the second interaction device, that is, a protocol supported by the operating system by default, the communication adapter can be directly used without installing a driver when the user inserts the communication adapter into the second interaction device, thereby achieving realizes plug and play of the communication adapter.

The communication protocol natively adapted to the device node may mean that: when the communication adapter is inserted into a corresponding hardware interface of the second interaction device, the device node may be generated by using the communication protocol, so that the communication protocol is natively adapted to the device node.

In an embodiment, the communication adapter includes an HID interface chip. In a case that the communication adapter is inserted into the second interaction device, the communication adapter can simulate a device node through the HID interface chip.

In an embodiment, S208 may further include: converting, by the communication adapter, the interaction data obtained through the decryption into target interaction data complying with the communication protocol natively adapted to the device node; and transmitting the target interaction data obtained through format conversion to the second interaction device through the simulated device node identifiable by the second interaction device.

The interaction data obtained through the decryption may exist in the form of a data packet. Specifically, the communication adapter parses the interaction data obtained through the decryption to obtain a header part and a body part, and then encapsulates the body part based on the communication protocol, to obtain the target interaction data in a target format complying with the communication protocol; or, adds a corresponding header to the interaction data based on the communication protocol, to obtain the target interaction data in a target format complying with the communication protocol. Then, the communication adapter transmits the target interaction data to the second interaction device through the simulated device node identifiable by the second interaction device.

In an embodiment, the target interaction data may belong to control type data or transaction type data, and correspondingly, the interaction data also belongs to control type data or transaction type data. S208 may further include: reporting, by the communication adapter, the target interaction data to the human-machine interaction controller node in a case that the target interaction data belongs to control type data, so that the second interaction device obtains the target interaction data through the human-machine interaction controller node; and reporting, by the communication adapter, the target interaction data to the human-machine interaction keyboard node in a case that the target interaction data belongs to transaction type data, so that the second interaction device obtains the target interaction data through the human-machine interaction keyboard node.

Specifically, the communication adapter reads a packet header of the target interaction data, and in response to determining that the target interaction data belongs to control type data according to an interface identifier in the packet header, selects the human-machine interaction controller node for data reporting according to the control type data, and then reports the target interaction data to the human-machine interaction controller node; or, selects the human-machine interaction controller node for data reporting according to the interface identifier in the packet header, and then reports the target interaction data to the human-machine interaction controller node. In response to determining that the target interaction data belongs to transaction type data according to the interface identifier in the packet header, the communication adapter selects a human-machine interaction keyboard node for data reporting according to the transaction type data, and then reports the target interaction data to the human-machine interaction keyboard node; or, selects the human-machine interaction keyboard node for data reporting according to the interface identifier in the packet header, and then reports the target interaction data to the human-machine interaction keyboard node.

In an embodiment, in a case that the encrypted interaction data or the control data received from the second interaction device belongs to a malicious attack packet, or a received network data packet originating from a network side terminal is a malicious attack packet, a security event is triggered, the security event being used for disabling the communication adapter.

The security event may be an event for changing an operational status of the communication adapter.

Specifically, the communication adapter further includes a tamper-proof point. When the tamper-proof point in the communication adapter detects an attack from the first interaction device, the second interaction device, or a network side terminal, it indicates that the transmitted data is at risk of being stolen. In this case, the tamper-proof point triggers a security event to disable the communication adapter.

Figure 4:
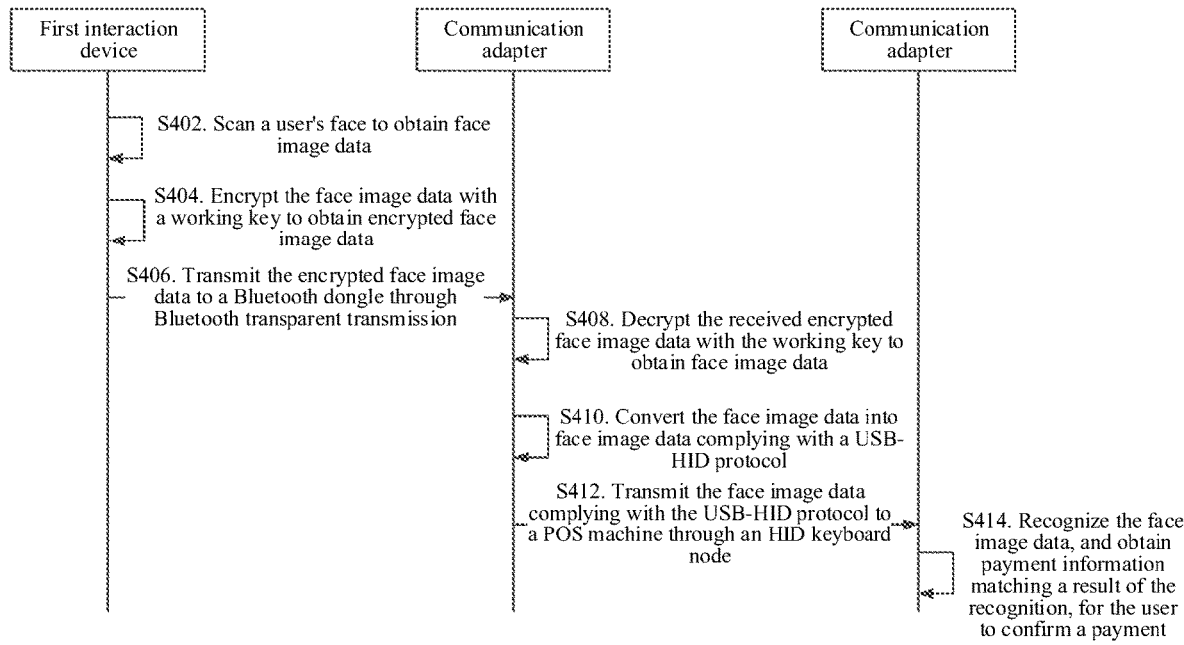
FIG. 4 is a schematic flowchart of a data transmission method according to some embodiments.

For a better understanding of the data transmission method, the application of the data transmission method to a face payment scenario is described. In the face payment scenario, the first interaction device may be a face scanning device configured to scan a face, the second interaction device may be a Point of Sales (POS) machine, and the communication adapter may be a Bluetooth dongle. The Bluetooth dongle is inserted into the second interaction device or integrated into the second interaction device. As shown in FIG. 4, the data transmission method may include the following operations:

S402. The face scanning device scans a user's face to obtain face image data.

S404. The face scanning device encrypts the face image data with a working key to obtain encrypted face image data.

The face scanning device includes a secure element (SE) chip, and the SE chip encrypts the face image data with the working key.

S406. The face scanning device transmits the encrypted face image data to a Bluetooth dongle through Bluetooth transparent transmission.

S408. The Bluetooth dongle decrypts the received encrypted face image data with the working key to obtain face image data.

The Bluetooth dongle includes a Bluetooth transparent transmission chip, an SE chip, an HID interface chip, a real-time clock (RTC) battery, and at least two tamper-proof points.

The SE chip of the Bluetooth dongle decrypts the received encrypted face image data with the working key to obtain the face image data.

S410. The Bluetooth dongle converts the face image data into face image data complying with a USB-HID protocol.

S412. The Bluetooth dongle transmits the face image data complying with the USB-HID protocol to a POS machine through an HID keyboard node.

S414. The POS machine recognizes the face image data, and obtains payment information matching a result of the recognition, for the user to confirm a payment.

The payment information may include a payment account associated with the user. The payment information may be transmitted by the POS machine to the face scanning device through the Bluetooth dongle, so that a display of the face scanning device displays the payment information, for the user to confirm the payment.

In the above embodiment, before data transmission is performed, the two-way authentication between the communication adapter and the first interaction device is performed, so as to ensure that the two devices involved in the data transmission are both reliable, and avoid an information security problem caused by the transmission of data to an unauthenticated device. After the two-way authentication is completed, the communication adapter starts to the encrypted interaction data transmitted by the first interaction device, and the encrypted interaction data is obtained by encrypting the interaction data based on the working key obtained by mapping the authentication key used in the two-way authentication, thereby effectively ensuring the security of interaction data during transmission. In addition, the communication adapter decrypts the encrypted interaction data through the working key obtained by mapping the authentication key stored therein, and transmits the interaction data obtained through the decryption to the second interaction device through the simulated device node identifiable by the second interaction device and based on the communication protocol of the second interaction device that is natively adapted to the device node, thereby avoiding the process of data encryption and decryption on the first interaction device and the second interaction device, eliminating the need for software adaptation on the two different devices, improving the universality of software, and improving the interaction effect between the first interaction device and the second interaction device. Moreover, because the device node simulated by the communication adapter is identifiable by the second interaction device, and the adopted communication protocol is natively adapted by the second interaction device, a compatibility between the communication adapter and the second interaction device can be achieved without installing a driver when the communication adapter is electrically connected to the second interaction device, thereby achieving a plug-and-play effect of the communication adapter, avoiding the preparation work before data transmission, and improving the overall operational efficiency of data transmission.

Figure 5:
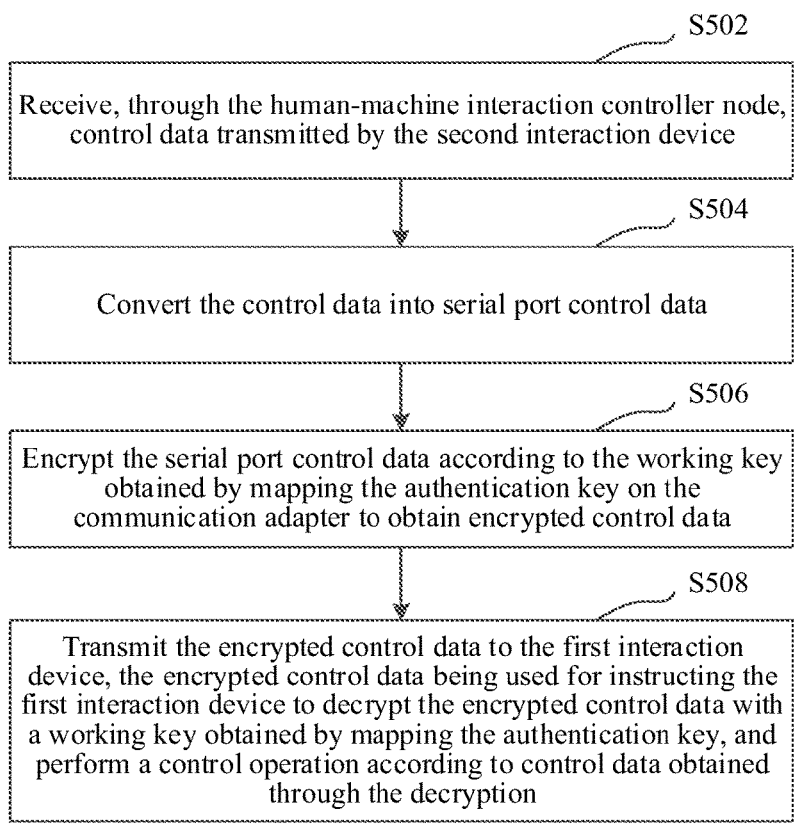
FIG. 5 is a schematic flowchart of operations of transmitting data from a second interaction device to a first interaction device according to some embodiments.

In an embodiment, as shown in FIG. 5, the method may further include the following operations:

S502. Receive, through the human-machine interaction controller node, control data transmitted by the second interaction device.

The human-machine interaction controller node is a device node simulated after the communication adapter is inserted into the second interaction device. The human-machine interaction controller node is identifiable by the second interaction device, and the control data may be transmitted to this node, so that the second interaction device and the communication adapter obtain the transmitted control data from this node.

S504. Convert the control data into serial port control data.

S506. Encrypt the serial port control data according to the working key obtained by mapping the authentication key on the communication adapter to obtain encrypted control data.

The SE chip on the communication adapter may map the authentication key to obtain the working key, then encrypt the serial port control data with the working key, and transmit the obtained encrypted control data to a wireless unit on the communication adapter. The wireless unit may include a Bluetooth transparent transmission chip or other wireless chips.

S508. Transmit the encrypted control data to the first interaction device, the encrypted control data being used for instructing the first interaction device to decrypt the encrypted control data with a working key obtained by mapping the authentication key, and perform a control operation according to control data obtained through the decryption.

The communication adapter may transmit the encrypted control data to the first interaction device through the wireless unit. For example, the communication adapter transmits the encrypted control data to the first interaction device through the Bluetooth transparent transmission chip by Bluetooth transparent transmission.

In the above embodiment, the control data from the second interaction device is encrypted with the working key, and then the encrypted control data obtained by the encryption is transmitted to the first interaction device. The first interaction device decrypts the encrypted control data with the working key obtained by mapping the authentication key, and the working key is the working key obtained by mapping the authentication key, so that the security of the interaction data during transmission can be effectively ensured.

Figure 6:
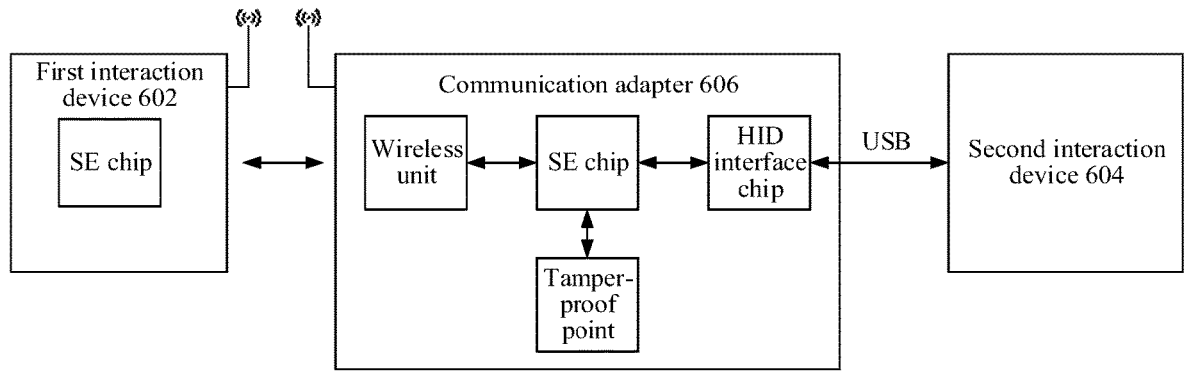
FIG. 6 is a structural block diagram of a data transmission system according some embodiments.

In an embodiment, as shown in FIG. 6, a data transmission system is provided. The system includes: a first interaction device 602, a second interaction device 604, and a communication adapter 606 wirelessly connected to the first interaction device and electrically connected to the second interaction device.

The communication adapter 606 is configured to authenticate the first interaction device 602.

The first interaction device 602 is configured to authenticate the communication adapter 606 in a case that the communication adapter 606 has completed the authentication, and after completing the authentication of the communication adapter, encrypt interaction data based on a working key obtained by mapping an authentication key used in two-way authentication to obtain encrypted interaction data.

The communication adapter 606 is further configured to receive the encrypted interaction data obtained by encrypting the interaction data based on the working key and transmitted by the first interaction device 602.

The communication adapter 606 may receive, through a wireless unit, the encrypted interaction data transmitted by the first interaction device 602.

The communication adapter 606 is further configured to decrypt the encrypted interaction data according to the working key obtained by mapping the authentication key on the communication adapter 606.

The communication adapter 606 may decrypt the encrypted interaction data through an SE chip. Specifically, after mapping the authentication key to obtain the working key, the SE chip in the communication adapter 606 decrypts the encrypted interaction data with the working key.

The second interaction device 604 is configured to identify a device node simulated by the communication adapter 606.

The communication adapter 606 is further configured to transmit interaction data obtained through the decryption to the second interaction device 604 through the simulated device node identifiable by the second interaction device 604 and based on a communication protocol of the second interaction device 604 that is natively adapted to the device node.

The communication adapter 606 simulates a virtual device node through the HID interface chip. The SE chip transmits the interaction data obtained through the decryption to the HID interface chip through a serial port. Then the HID interface chip converts the interaction data into target interaction data complying with the communication protocol, and then transmits the target interaction data to the second interaction device 604 through the device node.

In an embodiment, the communication adapter 606 is further configured to receive a first challenge code transmitted by the first interaction device 602; decrypt the first challenge code based on the authentication key to obtain a first random number, the first random number being a random number generated by the first interaction device 602; generate a second random number, and perform a hash operation on the first random number to obtain a first hash value; encrypt the first hash value and the second random number based on the authentication key to obtain a second challenge code; and transmit the second challenge code to the first interaction device 602;

the first interaction device 602 is further configured to decrypt the received second challenge code based on the authentication key to obtain a first hash value, compare the first hash value with a second hash value obtained by the first interaction device 602 by encrypting the first random number based on the authentication key, and in response to the first hash value being same as the second hash value, perform a hash operation on a second random number obtained by decrypting the second challenge code, and return a second hash value obtained by the hash operation; and the communication adapter 606 is further configured to receive the second hash value returned by the first interaction device 602, compare the second hash value with a third hash value obtained by performing a hash operation on the second random number based on the authentication key locally on the communication adapter 606, and in response to the second hash value being same as the third hash value, determine that the two-way authentication between the communication adapter 606 and the first interaction device 602 is complete.

The above encryption and decryption operations and the subsequent encryption and decryption operations may be executed by the SE chip of the first interaction device 106 or the SE chip of the communication adapter 606. For example, the SE chip of the communication adapter 606 decrypts the first challenge code based on the authentication key to obtain the first random number.

In an embodiment, the communication adapter 606 is further configured to receive a serial number obtaining request transmitted by the first interaction device 602; obtain a device serial number specified in the serial number obtaining request; and return the obtained device serial number to the first interaction device 602;

the first interaction device 602 is further configured to generate an authentication key on the first interaction device 602 based on the returned device serial number; and the communication adapter 606 is further configured to generate an authentication key on the communication adapter 606 according to the obtained device serial number, the authentication key on the first interaction device 602 being same as the authentication key on the communication adapter 606.

In an embodiment, the authentication key on the first interaction device 602 is obtained by encrypting the returned device serial number based on a serial number encryption key stored in the first interaction device 602.

The communication adapter 606 is further configured to obtain the serial number encryption key stored in the communication adapter 606; and encrypt the obtained device serial number based on the serial number encryption key to obtain the authentication key on the communication adapter 606.

In an embodiment, both the communication adapter 606 and the first interaction device 602 store the authentication key; the authentication key is generated based on a device serial number of the communication adapter 606;

the communication adapter 606 is further configured to, after the first interaction device 602 obtains the working key by mapping the authentication key stored therein and encrypts the interaction data with the obtained working key to obtain the encrypted interaction data, receive the encrypted interaction data obtained by encrypting the interaction data and transmitted by the first interaction device 602; and obtain the working key by mapping the authentication key stored in the communication adapter 606, and decrypting the encrypted interaction data based on the obtained working key.

In an embodiment, the communication adapter 606 is further configured to convert the interaction data obtained through the decryption into target interaction data complying with the communication protocol natively adapted to the device node; and transmit the target interaction data obtained through format conversion to the second interaction device 604 through the simulated device node identifiable by the second interaction device 604.

In an embodiment, the device node includes a human-machine interaction keyboard node and a human-machine interaction controller node; and the communication adapter 606 is further configured to: report the target interaction data to the human-machine interaction controller node in a case that the target interaction data belongs to control type data, so that the second interaction device 604 obtains the target interaction data through the human-machine interaction controller node; and report the target interaction data to the human-machine interaction keyboard node in a case that the target interaction data belongs to transaction type data, so that the second interaction device 604 obtains the target interaction data through the human-machine interaction keyboard node.

In an embodiment, the communication adapter 606 is further configured to trigger a security event, in a case that the encrypted interaction data or the control data received from the second interaction device 604 belongs to a malicious attack packet, or a received network data packet originating from a network side terminal is a malicious attack packet, the security event being used for disabling the communication adapter 606.

In response to determining that a tamper-proof point in the communication adapter 606 is maliciously attacked, the security event is triggered to disable the communication adapter 606.

In the above embodiment, before data transmission is performed, the communication adapter performs the two-way authentication between the communication adapter and the first interaction device, so as to ensure that the two devices involved in the data transmission are both reliable, and avoid an information security problem caused by the transmission of data to an unauthenticated device. After the two-way authentication is completed, the communication adapter starts to the encrypted interaction data transmitted by the first interaction device, and the encrypted interaction data is obtained by encrypting the interaction data based on the working key obtained by mapping the authentication key used in the two-way authentication, thereby effectively ensuring the security of interaction data during transmission. In addition, the communication adapter decrypts the encrypted interaction data through the working key obtained by mapping the authentication key stored therein, and transmits the interaction data obtained through the decryption to the second interaction device through the simulated device node identifiable by the second interaction device and based on the communication protocol of the second interaction device that is natively adapted to the device node, thereby avoiding the process of data encryption and decryption on the first interaction device and the second interaction device, eliminating the need for software adaptation on the two different devices, improving the universality of software, and improving the interaction effect between the first interaction device and the second interaction device. Moreover, because the device node simulated by the communication adapter is identifiable by the second interaction device, and the adopted communication protocol is natively adapted by the second interaction device, a compatibility between the communication adapter and the second interaction device can be achieved without installing a driver when the communication adapter is electrically connected to the second interaction device, thereby achieving a plug-and-play effect of the communication adapter, avoiding the preparation work before data transmission, and improving the overall operational efficiency of data transmission.

In an embodiment, the device node includes a human-machine interaction controller node; and the communication adapter 606 is further configured to: receive, through the human-machine interaction controller node, control data transmitted by the second interaction device 604; convert the control data into serial port control data; encrypt the serial port control data according to the working key obtained by mapping the authentication key on the communication adapter 606 to obtain encrypted control data; and transmit the encrypted control data to the first interaction device 602; and the first interaction device 602 is further configured to decrypt the encrypted control data with a working key obtained by mapping the authentication key, and perform a control operation according to control data obtained through the decryption.

In the above embodiment, the control data from the second interaction device is encrypted with the working key, and then the encrypted control data obtained by the encryption is transmitted to the first interaction device. The first interaction device decrypts the encrypted control data with the working key obtained by mapping the authentication key, and the working key is the working key obtained by mapping the authentication key, so that the security of the interaction data during transmission can be effectively ensured.

Figure 7:
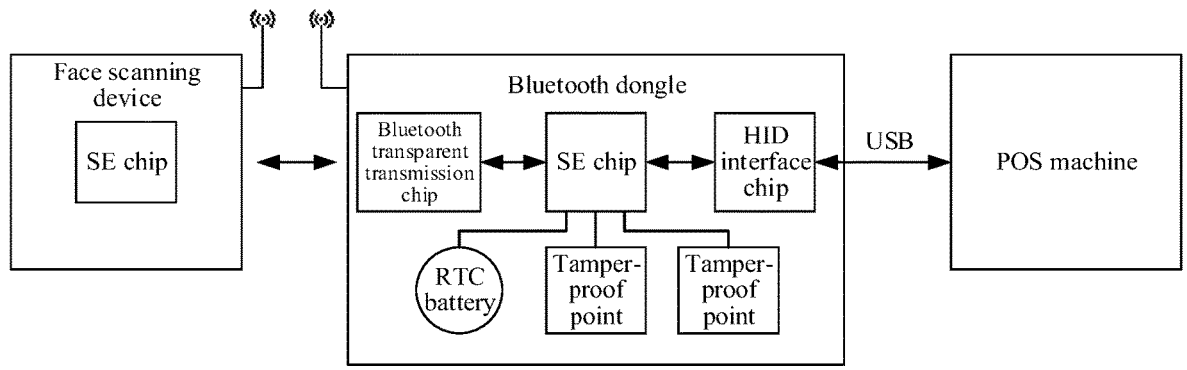
FIG. 7 is a structural block diagram of a data transmission system in a face payment scenario according to some embodiments.

When the data transmission system is applied to a face payment scenario, as shown in FIG. 7, the data transmission system includes a face scanning device, a Bluetooth dongle and a POS machine.

A) Face scanning device: It includes an SE chip, which may be configured to manage keys and encrypt and decrypt data transparently transmitted by Bluetooth. In addition, the face scanning device also has a Bluetooth function, and can support Blue 4.0 and above.

B) Bluetooth dongle It includes a Bluetooth transparent transmission chip, an SE chip, an HID interface chip and a tamper-proof point, etc.

The HID interface chip is a serial port to USB HID communication chip.

C) POS machine: It is a cashier POS host on a merchant side.

Next, the components included in the Bluetooth dongle are explained in detail:

1) Bluetooth Transparent Transmission Chip

The Bluetooth transparent transmission chip can perform two-way data transmission, as follows:

a. Serial data transmitted from the POS machine and encrypted by the SE chip is transmitted to the face scanning device through the Bluetooth transparent transmission chip.

b. Encrypted data transmitted from the face scanning device through the Bluetooth transparent transmission chip is decrypted by the SE chip, and data obtained through the decryption is transmitted to the POS machine.

2) HID Interface Chip

After the HID interface chip is inserted into the POS machine, two HID device nodes may be simulated on the POS machine. The device nodes include an HID keyboard node and an HID controller node. The HID interface chip may convert data conforming to a transmission format of the HID interface chip into data complying with the USB HID protocol standard, and then transmit the converted data to the POS machine through the simulated device node.

Systems such as Windows, Android, and Linux all support the USB HID protocol by default, so the driver-free update is realized on the POS machine side, and plug-and-play is achieved.

3) SE Chip

A security area of the SE chip stores keys of the Bluetooth dongle, such as an authentication key and a working key. The following functions can be performed by the SE chip:

a. two-way authentication with the face scanning device; and b. encryption of the data transparently transmitted by Bluetooth.

4) Tamper-Proof Point

After data is decrypted by the SE chip, data obtained through the decryption is transmitted to the HID interface chip through a serial port. If a PCB is directly exposed, the data is at risk of being stolen. Therefore, a tamper-proof point is configured on the Bluetooth dongle. When there is an external attack, the tamper-proof point can trigger a security event to disable the Bluetooth dongle device.

With the above system, the following method operations can be performed: generation of an authentication key, two-way authentication between the Bluetooth dongle and the face scanning device, as well as data encryption and transmission.

(I) Generation of authentication key.

Figure 8A:
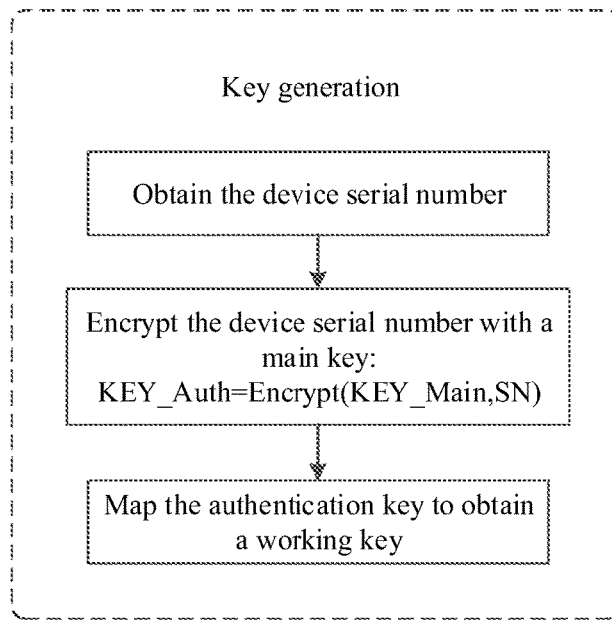
FIG. 8A is a schematic flowchart of operations of key generation according to some embodiments.
Figure 8B:
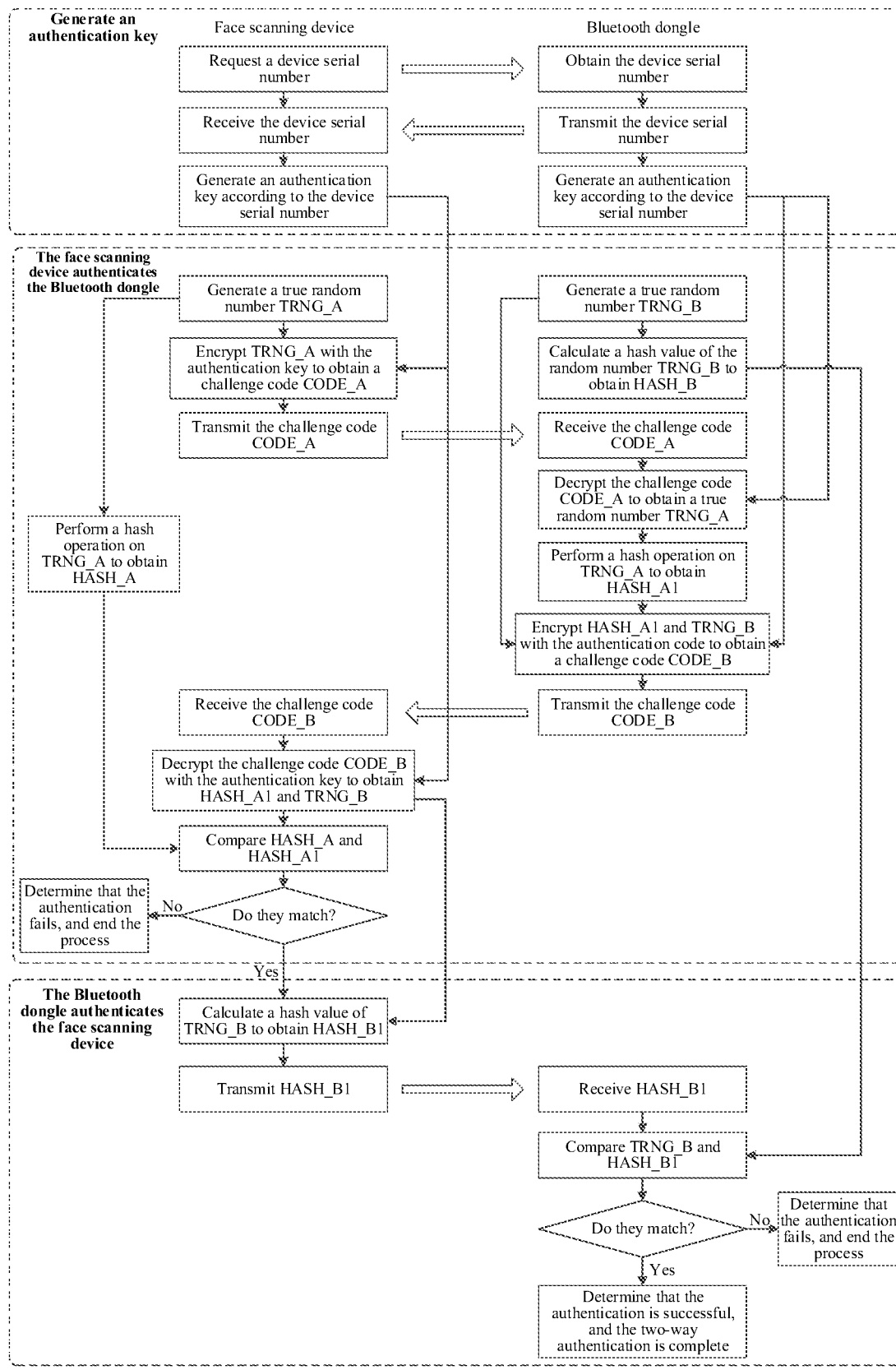
FIG. 8B is a schematic flowchart of operations of key generation and two-way authentication according to some embodiments.

As shown in FIG. 8A and FIG. 8B, the process of generating the authentication key may include the following operations:

1) Obtain a device serial number of the Bluetooth dongle.

2) Encrypt the device serial number with a main key KEY_Main, and use a result of the encryption as the authentication key. The encryption process is as follows:

KEY_Auth=Encrypt(KEY_Main,SN).

During the data transmission process, a static or dynamically changing working key may be generated based on the authentication key, and the data to be transmitted may be encrypted and decrypted with the working key.

(II) Two-way authentication between the face scanning device and the Bluetooth dongle.

As shown in FIG. 8b, the process of the two-way authentication may include the following operations:

1) The face scanning device requests the Bluetooth dongle for the device serial number of the Bluetooth dongle.

2) The face scanning device generates an authentication key KEY_Auth according to the device serial number of the Bluetooth dongle.

3) The face scanning device generates a true random number TRNG_A locally, and performs a hash operation on the TRNG_A to generate a corresponding hash value HASH_A=Hash(TRNG_A).

4) The face scanning device encrypts the true random number TRNG_A with the authentication key locally to generate a challenge code CODE_A.

CODE_A=Encrypt(KEY_Auth,TRNG_A).

5) The face scanning device transmits the challenge code CODE_A to the Bluetooth dongle through Bluetooth transparent transmission.

6) The Bluetooth dongle decrypts CODE_A with the authentication key, and performs a hash operation on the true random number TRNG_A obtained through the decryption to obtain HASH_A1.

7) The Bluetooth dongle generates a true random number TRNG_B locally.

8) The Bluetooth dongle encrypts HASH_A1 and TRNG_B with the authentication key to obtain a challenge code CODE_B.

CODE_B=Encrypt(KEY_Auth,HASH_A1,TRNG_B).

9) The Bluetooth dongle transmits the challenge code CODE_B to the face scanning device through Bluetooth transparent transmission.

10) The face scanning device decrypts CODE_B with the authentication key to obtain HASH_A1 and TRNG_B.

11) The face scanning device compares HASH_A generated by itself with the HASH_A1 generated by the Bluetooth dongle. When a result of the comparison indicates that HASH_A matches HASH_A1, it is determined that the Bluetooth dongle passes the authentication performed by the face scanning device. Otherwise, it is determined that the authentication fails and the process is ended.

12) The face scanning device performs a hash operation on the true random number TRNG_B of the Bluetooth dongle to obtain HASH_B1.

13) The face scanning device encrypts HASH_B1 with the authentication key, and transmits the encrypted HASH_B1 to the Bluetooth dongle through Bluetooth transparent transmission.

14) The Bluetooth dongle decrypts the encrypted HASH_B1 with the authentication key to obtain HASH_B1.

15) The Bluetooth dongle compares HASH_B generated by itself with the HASH_B1 generated by the face scanning device. If a result of the comparison indicates that HASH_B matches HASH_B1, it is determined that the face scanning device passes the authentication performed by the Bluetooth dongle. Otherwise, it is determined that the authentication fails and the process is ended.

(III) After the two-way authentication is completed, the face scanning device and the Bluetooth dongle are paired according to a Bluetooth standard protocol, and establish a data communication link.

(IV) Data encryption and transmission.

1) After a Bluetooth transmission channel is established between the face scanning device and the Bluetooth dongle, a working key is generated according to the authentication key.

2) When two-way data transmission is performed, the SE chip may use the working key to encrypt and decrypt the data, to realize the encryption and decryption of the data transparently transmitted by Bluetooth.

The transmission processes of data of different types or services are similar, but there are some differences as follows:

(1) Transmission of Payment Code Data

A) The face scanning device generates a payment code.

B) The SE chip of the face scanning device encrypts payment code data with the authentication key.

C) Transmit the encrypted payment code data to the Bluetooth transparent transmission chip on the Bluetooth dongle by Bluetooth transparent transmission.

D) After receiving the encrypted payment code data, the Bluetooth transparent transmission chip on the Bluetooth dongle transmits the encrypted payment code data to the SE chip on the Bluetooth dongle through a serial port.

E) The SE chip decrypts the payment code data with the authentication key.

F) The SE chip transmits the decrypted payment code data to the HID interface chip through a serial port.

G) The HID interface chip converts the received payment code data into payment code data complying with the HID protocol, and then reports same to the HID keyboard node.

H) The POS machine obtains the payment code data through the HID keyboard node, and then provides the payment code data for calling by an application layer.

(2) Transmission of Control Data

The control data may be bidirectionally communicated in the data transmission system.

The process of transmitting control data by the face scanning device is similar to the process of transmitting payment code data, and the main difference lies that the device node corresponding to the POS machine varies with the two processes, where the control data is transmitted to the HID controller node, and the payment code data is transmitted to the HID keyboard node. Next, the process of transmitting control data from the POS machine to the face scanning device is mainly described.

A) An application layer Enterprise Resource Planning (ERP) system in the POS machine delivers the control data to the HID controller node.

B) A driver layer transmits the control data received by the controller node to a corresponding hardware device CH9329 through a USB interface.

C) CH9329 converts the control data received by the USB interface into serial control data and transmits same to the SE chip on the dongle.

D) The SE chip encrypts the control data with an authenticated key, and transmits the encrypted control data to the Bluetooth transparent transmission chip through a serial port.

E) The Bluetooth transparent transmission chip CH9141 transparently transmits the received ciphertext to the face scanning device through Bluetooth.

F) The face scanning device transmits the control data received through Bluetooth to the SE chip inside the face scanning device.

G) The SE chip decrypts the control data with an authenticated key.

H) Provide the decrypted control data for calling by the application layer.

The following beneficial effects can be produced by implementing the solution of the above embodiment.

First, the wireless transmission has the advantages of low costs, driver-free and two-way communication.

Secondly, the encryption and decryption of the data transmitted by Bluetooth improves the security of data transmission.

It is to be understood that although the operations of the flowcharts in FIG. 2 to FIG. 4 are shown sequentially according to arrows, the operations are not necessarily performed in the orders indicated by arrows. Unless otherwise explicitly, execution of the operations is not strictly limited, and the operations may be performed in other sequences. In addition, at least some operations in FIG. 2 to FIG. 4 may include a plurality of operations or a plurality of stages. The operations or the stages are not necessarily performed at the same moment, and instead may be performed at different moments. The operations or the stages are not necessarily performed sequentially, and instead may be performed in turn or alternately with another operation or at least some of operations or stages of another operation.

Figure 9:
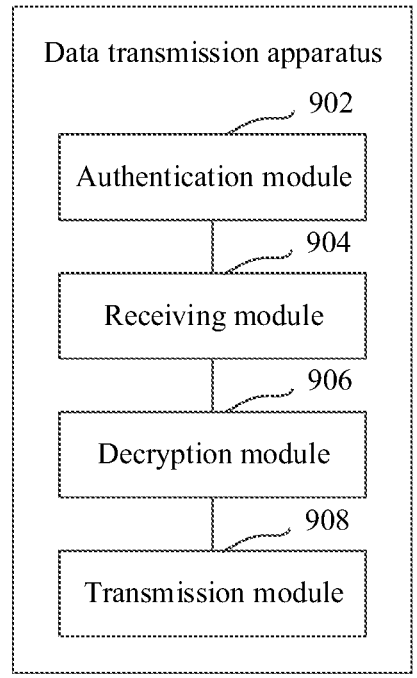
FIG. 9 is a structural block diagram of a data transmission apparatus according to some embodiments.

In an embodiment, as shown in FIG. 9, a data transmission apparatus is provided. The apparatus may be embodied as a part of a computer device in the form of software modules, hardware modules, or a combination thereof. The apparatus includes: an authentication module 902, a receiving module 904, a decryption module 906 and a transmission module 908.

The authentication module 902 is configured to perform two-way authentication with a first interaction device.

The receiving module 904 is configured to receive encrypted interaction data obtained by encrypting interaction data based on a working key and transmitted by the first interaction device, after the two-way authentication is completed, the working key being obtained by the first interaction device by mapping an authentication key used in the two-way authentication.

The decryption module 906 is configured to decrypt the encrypted interaction data according to the working key obtained by mapping the authentication key on the communication adapter.

The transmission module 908 is configured to transmit interaction data obtained through the decryption to a second interaction device through a simulated device node identifiable by the second interaction device and based on a communication protocol of the second interaction device that is natively adapted to the device node.

In an embodiment, the authentication module 902 may be further configured to receive a first challenge code transmitted by the first interaction device; decrypt the first challenge code based on the authentication key to obtain a first random number, the first random number being a random number generated by the first interaction device; generate a second random number, and perform a hash operation on the first random number to obtain a first hash value; encrypts the first hash value and the second random number based on the authentication key to obtain a second challenge code; transmits the second challenge code to the first interaction device, so that the first interaction device decrypts the second challenge code based on the authentication key to obtain a first hash value, compares the first hash value with a second hash value obtained by the first interaction device by encrypting the first random number based on the authentication key, and in response to the first hash value being same as the second hash value, performs a hash operation on a second random number obtained by decrypting the second challenge code, and returns a second hash value obtained by the hash operation; and receives the second hash value returned by the first interaction device, compares the second hash value with a third hash value obtained by performing a hash operation on the second random number based on the authentication key locally on the communication adapter, and in response to the second hash value being same as the third hash value, determines that the two-way authentication between the communication adapter and the first interaction device is complete.

Figure 10:
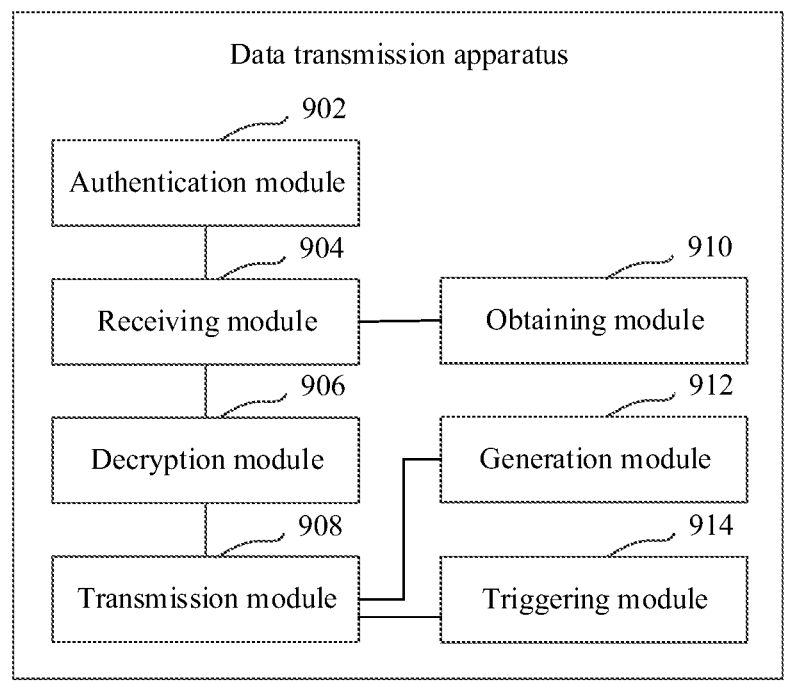
FIG. 10 is a structural block diagram of a data transmission apparatus according to some embodiments.

In an embodiment, as shown in FIG. 10, the apparatus may further include:

the receiving module 904 being further configured to receive a serial number obtaining request transmitted by the first interaction device, an obtaining module 910, configured to obtain a device serial number specified in the serial number obtaining request;

the transmission module 908 being further configured to return the obtained device serial number to the first interaction device, so that the first interaction device generates an authentication key on the first interaction device based on the returned device serial number; and a generation module 912, configured to generate an authentication key on the communication adapter according to the obtained device serial number, the authentication key on the first interaction device being same as the authentication key on the communication adapter.

In an embodiment, the authentication key on the first interaction device is obtained by encrypting the returned device serial number based on a serial number encryption key stored in the first interaction device.

The generation module 912 may be further configured to obtain the serial number encryption key stored in the communication adapter; and encrypt the obtained device serial number based on the serial number encryption key to obtain the authentication key on the communication adapter.

In an embodiment, both the communication adapter and the first interaction device store the authentication key; the authentication key is generated based on a device serial number of the communication adapter;

the receiving module 904 may be further configured to, after the first interaction device obtains the working key by mapping the authentication key stored therein and encrypts the interaction data with the obtained working key to obtain the encrypted interaction data, receive the encrypted interaction data obtained by encrypting the interaction data and transmitted by the first interaction device; and the decryption module 906 may be further configured to obtain the working key by mapping the authentication key stored in the communication adapter, and decrypt the encrypted interaction data based on the obtained working key.

In an embodiment, the transmission module 908 may be further configured to convert the interaction data obtained through the decryption into target interaction data complying with the communication protocol natively adapted to the device node; and transmit the target interaction data obtained through format conversion to the second interaction device through the simulated device node identifiable by the second interaction device.

In an embodiment, the device node includes a human-machine interaction keyboard node and a human-machine interaction controller node; and the transmission module 908 may be further configured to: report the target interaction data to the human-machine interaction controller node in a case that the target interaction data belongs to control type data, so that the second interaction device obtains the target interaction data through the human-machine interaction controller node; and report the target interaction data to the human-machine interaction keyboard node in a case that the target interaction data belongs to transaction type data, so that the second interaction device obtains the target interaction data through the human-machine interaction keyboard node.

In an embodiment, as shown in FIG. 10, the apparatus may further include:

a triggering module 914, configured to trigger a security event, in a case that the encrypted interaction data or the control data received from the second interaction device belongs to a malicious attack packet, or a received network data packet originating from a network side terminal is a malicious attack packet, the security event being used for disabling the communication adapter.

In the above embodiment, before data transmission is performed, the two-way authentication between the communication adapter and the first interaction device is performed, so as to ensure that the two devices involved in the data transmission are both reliable, and avoid an information security problem caused by the transmission of data to an unauthenticated device. After the two-way authentication is completed, the communication adapter starts to the encrypted interaction data transmitted by the first interaction device, and the encrypted interaction data is obtained by encrypting the interaction data based on the working key obtained by mapping the authentication key used in the two-way authentication, thereby effectively ensuring the security of interaction data during transmission. In addition, the communication adapter decrypts the encrypted interaction data through the working key obtained by mapping the authentication key stored therein, and transmits the interaction data obtained through the decryption to the second interaction device through the simulated device node identifiable by the second interaction device and based on the communication protocol of the second interaction device that is natively adapted to the device node, thereby avoiding the process of data encryption and decryption on the first interaction device and the second interaction device, eliminating the need for software adaptation on the two different devices, improving the universality of software, and improving the interaction effect between the first interaction device and the second interaction device. Moreover, because the device node simulated by the communication adapter is identifiable by the second interaction device, and the adopted communication protocol is natively adapted by the second interaction device, a compatibility between the communication adapter and the second interaction device can be achieved without installing a driver when the communication adapter is electrically connected to the second interaction device, thereby achieving a plug-and-play effect of the communication adapter, avoiding the preparation work before data transmission, and improving the overall operational efficiency of data transmission.

In an embodiment, the device node includes a human-machine interaction controller node; and as shown in FIG. 10, the apparatus may further include:

the receiving module 904 being further configured to receive, through the human-machine interaction controller node, control data transmitted by the second interaction device;

a conversion module 916, configured to convert the control data into serial port control data;

an encryption module 918, configured to encrypt the serial port control data according to the working key obtained by mapping the authentication key on the communication adapter to obtain encrypted control data; and the transmission module 908 being further configured to transmit the encrypted control data to the first interaction device, the encrypted control data being used for instructing the first interaction device to decrypt the encrypted control data with a working key obtained by mapping the authentication key, and perform a control operation according to control data obtained through the decryption.

In the above embodiment, the control data from the second interaction device is encrypted with the working key, and then the encrypted control data obtained by the encryption is transmitted to the first interaction device. The first interaction device decrypts the encrypted control data with the working key obtained by mapping the authentication key, and the working key is the working key obtained by mapping the authentication key, so that the security of the interaction data during transmission can be effectively ensured.

For a specific limitation on the data transmission apparatus, refer to the limitation on the data transmission method above. Details are not described herein again. The modules in the foregoing data transmission apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a Bluetooth dongle, and an internal structure diagram thereof may be shown in FIG. 11. The computer device includes a processor, a memory, and a network interface that are connected by using a system bus. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for running of the operating system and the computer-readable instructions in the non-volatile storage medium. The database of the computer device is configured to store interaction data, an authentication key, a working key, and the like. The network interface of the computer device is configured to communicate with an external terminal through a network connection. The computer-readable instructions are executed by the processor to implement a data transmission method.

Figure 11:
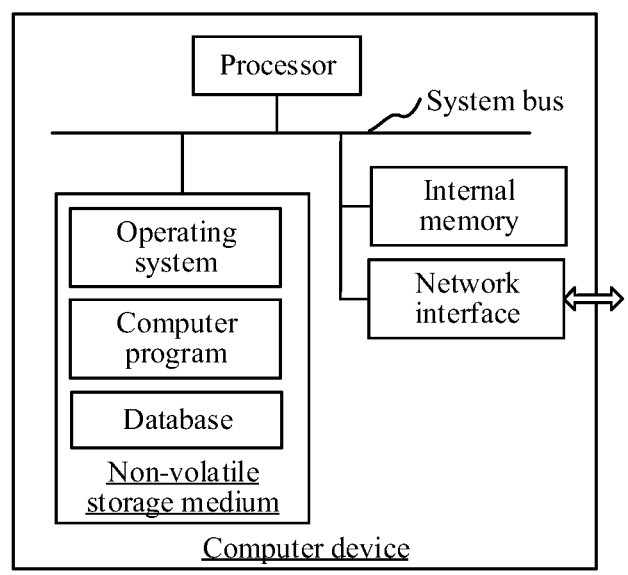
FIG. 11 is an internal structure diagram of a computer device according to some embodiments.

A person skilled in the art may understand that, the structure shown in FIG. 11 is only a block diagram of a part of a structure correlated to a solution of the disclosure and does not limit the computer device to which the solution is applied. Specifically, the computer device may include more or fewer members than those in the drawings, or include a combination of some members, or include different member layouts.

In an embodiment, a computer device is provided, including a memory and a processor, the memory storing computer-readable instructions, the processor, when executing the computer-readable instructions, implementing the operations in the foregoing method embodiments.

In an embodiment, a computer-readable storage medium is provided, storing computer-readable instructions, the computer-readable instructions, when executed by a processor, implementing the operations in the foregoing method embodiments.

In an embodiment, a computer program product is provided. The computer program product includes computer instructions, and the computer instructions are stored in a computer-readable storage medium. The processor of the computer device reads the computer instructions from the computer-readable storage medium, and the processor executes the computer instructions, to cause the computer device to perform the operations in the method embodiments.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a storage, a database, or another medium used in the embodiments provided may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of the disclosure, which are described specifically and in detail, but cannot be construed as a limitation to the patent scope. For a person of ordinary skill in the art, several transformations and improvements can be made without departing from the idea of the disclosure. These transformations and improvements belong to the protection scope. Therefore, the protection scope of the disclosure shall be subject to the appended claims.

What is claimed is:

1. A data transmission method, executed by a communication adapter, and the method comprising:
performing two-way authentication with a first interaction device;
receiving encrypted interaction data obtained by encrypting interaction data based on a working key and transmitted by the first interaction device, after the two-way authentication is completed, the working key being obtained by the first interaction device by mapping an authentication key used in the two-way authentication;
decrypting the encrypted interaction data according to the working key obtained by mapping the authentication key on the communication adapter; and
transmitting the decrypted interaction data obtained through the decryption to a second interaction device through a simulated device node identifiable by the second interaction device and based on a communication protocol of the second interaction device that is natively adapted to the device node.

2. The data transmission method according to claim 1, wherein the performing comprises:
receiving a first challenge code transmitted by the first interaction device;
decrypting the first challenge code based on the authentication key to obtain a first random number, the first random number being a random number generated by the first interaction device;
performing a hash operation on the first random number to obtain a first hash value;
generating a second random number, and encrypting the first hash value and the second random number based on the authentication key to obtain a second challenge code;
transmitting the second challenge code to the first interaction device, so that the first interaction device decrypts the second challenge code based on the authentication key to obtain a first hash value, compares the first hash value with a second hash value obtained by the first interaction device by encrypting the first random number based on the authentication key, and in response to the first hash value being same as the second hash value, performs a hash operation on a second random number obtained by decrypting the second challenge code, and returns a second hash value obtained by the hash operation; and
receiving the second hash value returned by the first interaction device, comparing the second hash value with a third hash value obtained by performing a hash operation on the second random number based on the authentication key locally on the communication adapter, and in response to the second hash value being same as the third hash value, determining that the two-way authentication between the communication adapter and the first interaction device is complete.

3. The data transmission method according to claim 2, wherein the method further comprises:
receiving a serial number obtaining request transmitted by the first interaction device;
obtaining a device serial number specified in the serial number obtaining request;
returning the obtained device serial number to the first interaction device, so that the first interaction device generates an authentication key on the first interaction device based on the returned device serial number; and
generating an authentication key on the communication adapter according to the obtained device serial number, the authentication key on the first interaction device being same as the authentication key on the communication adapter.

4. The data transmission method according to claim 3, wherein the authentication key on the first interaction device is obtained by encrypting the returned device serial number based on a serial number encryption key stored in the first interaction device; and
    the generating an authentication key on the communication adapter according to the obtained device serial number comprises:
    obtaining the serial number encryption key stored in the communication adapter; and
    encrypting the obtained device serial number based on the serial number encryption key to obtain the authentication key on the communication adapter.

5. The data transmission method according to claim 2, wherein both the communication adapter and the first interaction device store the authentication key, the authentication key is generated based on a device serial number of the communication adapter, and the receiving encrypted interaction data comprises:
    after the first interaction device obtains the working key by mapping the authentication key stored therein and encrypts the interaction data with the obtained working key to obtain the encrypted interaction data, receiving the encrypted interaction data obtained by encrypting the interaction data and transmitted by the first interaction device; and
    the decrypting the encrypted interaction data according to the working key obtained by mapping the authentication key on the communication adapter comprises:
    obtaining the working key by mapping the authentication key stored in the communication adapter, and decrypting the encrypted interaction data based on the obtained working key.

6. The data transmission method according to claim 1, wherein the transmitting interaction data comprises:
    converting the interaction data obtained through the decryption into target interaction data complying with the communication protocol natively adapted to the device node; and
    transmitting the target interaction data obtained through format conversion to the second interaction device through the simulated device node identifiable by the second interaction device.

7. The data transmission method according to claim 6, wherein the device node comprises a human-machine interaction keyboard node and a human-machine interaction controller node, and the transmitting the target interaction data comprises:
    reporting the target interaction data to the human-machine interaction controller node in a case that the target interaction data belongs to control type data, so that the second interaction device obtains the target interaction data through the human-machine interaction controller node; and
    reporting the target interaction data to the human-machine interaction keyboard node in a case that the target interaction data belongs to transaction type data, so that the second interaction device obtains the target interaction data through the human-machine interaction keyboard node.

8. The data transmission method according to claim 1, wherein the device node comprises a human-machine interaction controller node; and the method further comprises:
    receiving, through the human-machine interaction controller node, control data transmitted by the second interaction device;
    converting the control data into serial port control data;
    encrypting the serial port control data according to the working key obtained by mapping the authentication key on the communication adapter to obtain encrypted control data; and
    transmitting the encrypted control data to the first interaction device, the encrypted control data being used for instructing the first interaction device to decrypt the encrypted control data with a working key obtained by mapping the authentication key, and perform a control operation according to control data obtained through the decryption.

9. The data transmission method according to claim 8, wherein the method further comprises:
    in a case that the encrypted interaction data or the control data received from the second interaction device belongs to a malicious attack packet, or a received network data packet originating from a network side terminal is a malicious attack packet,
    triggering a security event, the security event being used for disabling the communication adapter.

10. A data transmission system comprising:
    at least one memory configured to store program code; and
    at least one processor configured to read the program code and operate as instructed by the program code, the program code comprising:
    authentication code configured to cause the at least one processor to perform two-way authentication with a first interaction device;
    receiving code configured to cause the at least one processor to receive encrypted interaction data obtained by encrypting interaction data based on a working key and transmitted by the first interaction device, after the two-way authentication is completed, the working key being obtained by the first interaction device by mapping an authentication key used in the two-way authentication;
    decryption code configured to cause the at least one processor to decrypt the encrypted interaction data according to the working key obtained by mapping the authentication key on a communication adapter; and
    transmission code configured to cause the at least one processor to transmit the decrypted interaction data obtained through the decryption to a second interaction device through a simulated device node identifiable by the second interaction device and based on a communication protocol of the second interaction device that is natively adapted to the device node.

11. The data transmission system according to claim 10, wherein the authentication code is further configured to cause the at least one processor to:
    receive a first challenge code transmitted by the first interaction device;
    decrypt the first challenge code based on the authentication key to obtain a first random number, the first random number being a random number generated by the first interaction device;
    generate a second random number, and perform a hash operation on the first random number to obtain a first hash value;
    encrypt the first hash value and the second random number based on the authentication key to obtain a second challenge code;

transmit the second challenge code to the first interaction device, so that the first interaction device decrypts the second challenge code based on the authentication key to obtain a first hash value, compare the first hash value with a second hash value obtained by the first interaction device by encrypting the first random number based on the authentication key, and in response to the first hash value being same as the second hash value, perform a hash operation on a second random number obtained by decrypting the second challenge code, and returns a second hash value obtained by the hash operation; and receive the second hash value returned by the first interaction device, compare the second hash value with a third hash value obtained by performing a hash operation on the second random number based on the authentication key locally on the communication adapter, and in response to the second hash value being same as the third hash value, determine that the two-way authentication between the communication adapter and the first interaction device is complete.

12. The data transmission system according to claim 11, wherein the receiving code is further configured to cause the at least one processor to receive a serial number obtaining request transmitted by the first interaction device; and the program code further comprises obtaining code configured to cause the at least one processor to obtain a device serial number specified in the serial number obtaining request.

13. The data transmission system according to claim 12, wherein the transmission code is further configured to cause the at least one processor to return the obtained device serial number to the first interaction device, so that the first interaction device generates an authentication key on the first interaction device based on the returned device serial number, and the program code further comprises generation code configured to cause the at least one processor to generate an authentication key on the communication adapter according to the obtained device serial number, the authentication key on the first interaction device being the same as the authentication key on the communication adapter.

14. The data transmission system according to claim 11, wherein both the communication adapter and the first interaction device store the authentication key, the authentication key is generated based on a device serial number of the communication adapter;

the receiving code is further configured to cause the at least one processor to, after the first interaction device obtains the working key by mapping the authentication key stored therein and encrypts the interaction data with the obtained working key to obtain the encrypted interaction data, receive the encrypted interaction data obtained by encrypting the interaction data and transmitted by the first interaction device; and the decryption code is further configured to cause the at least one processor to obtain the working key by mapping the authentication key stored in the communication adapter, and decrypt the encrypted interaction data based on the obtained working key.

15. The data transmission system according to claim 10, wherein the transmission code is further configured to cause the at least one processor to:

convert the interaction data obtained through the decryption into target interaction data complying with the communication protocol natively adapted to the device node; and transmit the target interaction data obtained through format conversion to the second interaction device through the simulated device node identifiable by the second interaction device.

16. The data transmission system according to claim 15, wherein the device node includes a human-machine interaction keyboard node and a human-machine interaction controller node; and the transmission code is further configured to cause the at least one processor to:

report the target interaction data to the human-machine interaction controller node in a case that the target interaction data belongs to control type data, so that the second interaction device obtains the target interaction data through the human-machine interaction controller node; and report the target interaction data to the human-machine interaction keyboard node in a case that the target interaction data belongs to transaction type data, so that the second interaction device obtains the target interaction data through the human-machine interaction keyboard node.

17. The data transmission system according to claim 10, wherein the program code further comprises triggering code configured to cause the at least one processor to trigger a security event, in a case that the encrypted interaction data or the control data received from the second interaction device belongs to a malicious attack packet, or a received network data packet originating from a network side terminal is a malicious attack packet, the security event being used for disabling the communication adapter.

18. A non transitory computer-readable storage medium, storing computer code that when executed by at least one processor causes the at least one processor to:

perform two-way authentication with a first interaction device;

receive encrypted interaction data obtained by encrypting interaction data based on a working key and transmitted by the first interaction device, after the two-way authentication is completed, the working key being obtained by the first interaction device by mapping an authentication key used in the two-way authentication;

decrypt the encrypted interaction data according to the working key obtained by mapping the authentication key on the communication adapter; and transmit the decrypted interaction data obtained through the decryption to a second interaction device through a simulated device node identifiable by the second interaction device and based on a communication protocol of the second interaction device that is natively adapted to the device node.

19. The non-transitory computer-readable storage medium according to claim 18, wherein the perform comprises:

receiving a first challenge code transmitted by the first interaction device;

decrypting the first challenge code based on the authentication key to obtain a first random number, the first random number being a random number generated by the first interaction device;

performing a hash operation on the first random number to obtain a first hash value;

generating a second random number, and encrypting the first hash value and the second random number based on the authentication key to obtain a second challenge code;

transmitting the second challenge code to the first interaction device, so that the first interaction device decrypts the second challenge code based on the authentication key to obtain a first hash value, compares the first hash value with a second hash value obtained by the first interaction device by encrypting the first random number based on the authentication key, and in response to the first hash value being same as the second hash value, performs a hash operation on a second random number obtained by decrypting the second challenge code, and returns a second hash value obtained by the hash operation; and receiving the second hash value returned by the first interaction device, comparing the second hash value with a third hash value obtained by performing a hash operation on the second random number based on the authentication key locally on the communication adapter, and in response to the second hash value being same as the third hash value, determining that the two-way authentication between the communication adapter and the first interaction device is complete.

20. The non-transitory computer-readable storage medium according to claim 19, wherein the program code is further configured to cause the at least one processor to:

receive a serial number obtaining request transmitted by the first interaction device;

obtain a device serial number specified in the serial number obtaining request;

return the obtained device serial number to the first interaction device, so that the first interaction device generates an authentication key on the first interaction device based on the returned device serial number; and generate an authentication key on the communication adapter according to the obtained device serial number, the authentication key on the first interaction device being same as the authentication key on the communication adapter.

* * * * *